Figure 1:
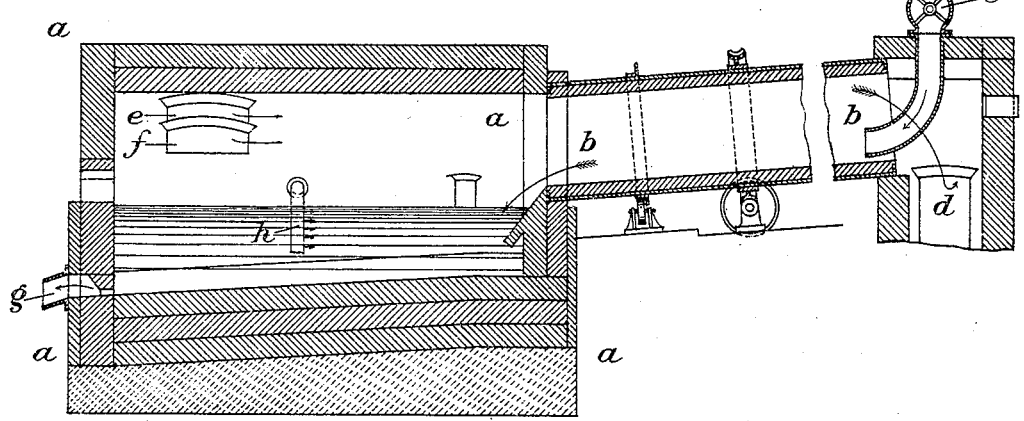

No. 792,632. PATENTED JUNE 20, 1905.
H. TEE.
MANUFACTURE OF SALT.
APPLICATION FILED MAY 3, 1904.

2 SHEETS—SHEET 1.

WITNESSES
H. M. Kuehne
Edmund Hancock

INVENTOR
Harry Tee
By Richardson
ATTORNEYS

No. 792,632. PATENTED JUNE 20, 1905.
H. TEE.
MANUFACTURE OF SALT.
APPLICATION FILED MAY 3, 1904.
2 SHEETS—SHEET 2.
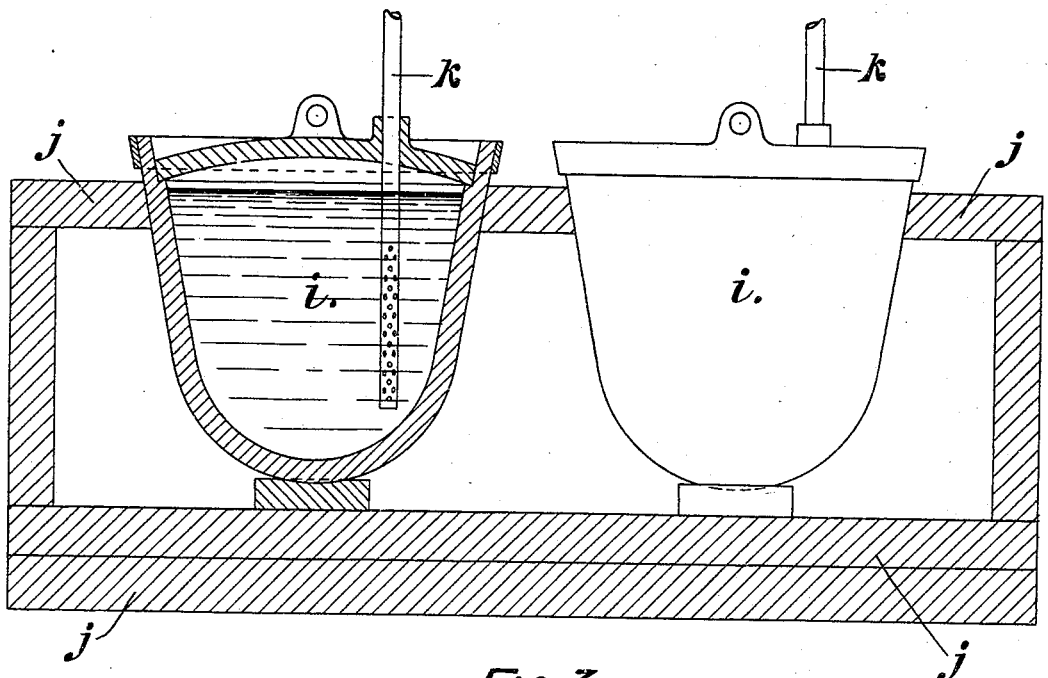
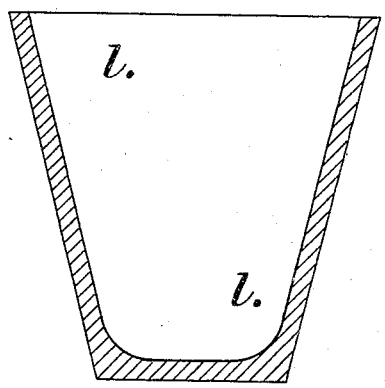
Witnesses
H. M. Kuehne
J. P. Gluvman
Inventor
Harry Tee
By Richards
ATTORNEYS No. 792,632.

Patented June 20, 1905.

UNITED STATES PATENT OFFICE.

HARRY TEE, OF SEAFORTH, NEAR LIVERPOOL, ENGLAND.

MANUFACTURE OF SALT.

SPECIFICATION forming part of Letters Patent No. 792,632, dated June 20, 1905.

Application filed May 3, 1904. Serial No. 206,139.

*To all whom it may concern:*

Be it known that I, HARRY TEE, a subject of the King of England, and a resident of Seaforth, near Liverpool, in the county of Lancaster, England, have invented certain new and useful Improvements in or Connected with the Manufacture of Salt, of which the following is a specification.

This invention has for its object the manufacture of white and practically pure salt (chlorid of sodium) from impure and discolored rock-salt by the melting process, whereby white salt can be manufactured from the natural discolored or dirty rock-salt in large quantities and at small cost, and according to this invention the impure and dirty rock-salt is melted by heat in a suitable vessel and through this molten mass of salt air is blown for a considerable time—say for twenty to forty minutes, according to the amount of impurities in the salt—whereby the impurities—namely, organic substances—are oxidized or burned and the residue falls. When the charge or molten mass has been subjected to the air-blast and treatment for the required period, it is allowed to become quite still—that is, without natural circulation—and remain in a molten state quiescent for a period, during which the impurities and residue settle out, falling to the bottom, the salt above being then clear and is perfectly white when cooled.

Lime or equivalent substances in small quantities—say from .1 to 1.0 per cent.—may be added to the salt to assist the separation of the oxidized iron contained in the salt from such salt. The molten clarified salt is then run off into cooling vessels or onto floors. The slag is also run off from the vessel by a separate outlet at the bottom.

The air used to oxidize the impurities of the salt is advantageously heated to a high degree before being introduced into the molten salt and blown through it.

In the drawings illustrating the invention, Figure 1 is a sectional elevation showing a melting-furnace, the salt being melted by gases acting upon its surface in the manner of a metal reverberatory furnace. Figs. 2 and 3 are sectional elevations showing the vessels in which the salt is blown with air and subsequently cooled, respectively.

The furnace may be made to hold several tons—say up to twenty tons or over—and it consists of suitable brickwork hearth, sides, ends, and roof, (generally designated *a*,) and the salt is fed into it by a "revolver-feed" *b*, set at a suitable incline, and up this revolver the discharge or "waste" gases from the furnace pass on their way to the discharge-flue and heat the broken salt as it flows down the revolver. By the time the salt reaches the furnace it will be very hot and melts very quickly as it falls into the molten salt on the hearth of the furnace. The revolver-feed is of the well-known construction, mounted on wheels *b'*, and rotated mechanically in any known way.

The broken rock-salt may be fed in by a revolving-feed device *c* on the upper end of the regenerative revolver *b*, and the gases may pass away by the flue *d*.

The air and gas inlets are marked *e* and *f*, and the molten salt-tapping-out hole is marked *g*.

If the melting process be carried on continuously in the furnace *a*, the molten salt is tapped out into suitable sized ladles or vessels *i*, which are moved by suitable means to a fireplace or bed *j*, which will keep the salt molten, and in these vessels *i* it is treated with heated air, (and the lime,) as above described, blown through pipes *k*, inserted into the salt, and then decanted or run out into molds or vessels *l*, in which it remains quite quiet for a time to effect the separation of salt and foreign matters and allow the latter to fall to the bottom. With regard to the passing of air through the molten body of salt this operation must be continued for from about twenty minutes to forty minutes, according to the degree of impurities in the salt, and after this operation has been performed the molten salt must be kept in a quiescent state for a considerable time, varying between twenty minutes and forty minutes, during which time no ebullition must take place; but, on the other hand, the salt must not cool nor commence to solidify—that is to say, it must